United States Patent
Funke et al.

(10) Patent No.: US 6,823,228 B2
(45) Date of Patent: Nov. 23, 2004

(54) FABRICATOR CAPACITY ANALYSIS

(75) Inventors: Otto J. Funke, North Ferrisburgh, VT (US); Edward F. Merrill, Jr., Alburg, VT (US); Manoj S. Sanghvi, So. Burlington, VT (US); Sharon B. Sisler, Waterbury, VT (US); George E. Thyng, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 09/683,837

(22) Filed: Feb. 21, 2002

(65) Prior Publication Data

US 2003/0159123 A1 Aug. 21, 2003

(51) Int. Cl.[7] ............................................... G06F 19/00
(52) U.S. Cl. ..................... 700/111; 700/99; 700/100; 700/109
(58) Field of Search ..................... 700/99, 100, 109, 700/111

(56) References Cited

U.S. PATENT DOCUMENTS

| | | | |
|---|---|---|---|
| 5,231,567 A | | 7/1993 | Matoba et al. |
| 5,280,425 A | * | 1/1994 | Hogge ........................ 712/300 |
| 5,479,343 A | | 12/1995 | Matoba et al. |
| 5,612,886 A | | 3/1997 | Weng |
| 5,748,478 A | | 5/1998 | Pan et al. |
| 5,889,673 A | | 3/1999 | Pan et al. |
| 5,940,298 A | * | 8/1999 | Pan et al. .................... 700/100 |
| 5,946,212 A | * | 8/1999 | Bermon et al. ................ 700/97 |
| 5,950,170 A | | 9/1999 | Pan et al. |
| RE36,360 E | | 10/1999 | Costanza |
| 5,999,920 A | | 12/1999 | Sato et al. |
| 6,128,588 A | | 10/2000 | Chacon |
| 6,259,959 B1 | * | 7/2001 | Martin ........................ 700/99 |
| 6,319,737 B1 | * | 11/2001 | Putnam et al. ................ 438/17 |
| 2003/0050817 A1 | * | 3/2003 | Cargille et al. ................ 705/8 |

OTHER PUBLICATIONS

"Capacity Planning Model: The Important Inputs, Formulas, and Benefits"—Thomas J. Occhino, White Oak Semiconductor, IEEE 2000.*

"Evaluation of Capacity Planning Practices for the Semiconductor Industry"—Metin Cakanyildirim et al. Aug. 2002. IEEE.*

* cited by examiner

*Primary Examiner*—Leo Picard
*Assistant Examiner*—Michael D. Masinick
(74) *Attorney, Agent, or Firm*—Richard M. Kotulak; Hoffman, Warnick & D'Alessandro LLC

(57) ABSTRACT

A system, method and program product for analyzing fabricator capacity. The invention simplifies analysis by determining a common tool set capacity based on common non-key shared tool sets, a technology capacity based on a unique tool set for a technology, and key shared tool set capacity. Capacity opportunities and constraints, and the capacity shortfalls of tool sets are then evident. Many potential fabricator wafer start loadings can quickly be assessed and the best candidates analyzed further by more detailed, but time-consuming methods.

17 Claims, 5 Drawing Sheets

US 6,823,228 B2

FABRICATOR CAPACITY ANALYSIS

BACKGROUND OF THE INVENTION

1. Technical Field

The present invention relates generally to fabricator capacity analysis, and more particularly, to a system and method for simplified fabricator capacity analysis.

2. Related Art

Fabricator capacity analysis is a very time-consuming and complex process. This is especially the case for a multi-technology, multi-part semiconductor fabricator. Current systems and methods evaluate the entire fabricator using very complex processing that considers practically every tool set within a fabricator, and a myriad of what-ifs.

Unfortunately, for larger semiconductor manufacturers, market dynamics and strategies require quicker decision making. For example, a quick determination is advantageous in deciding how best to use capacity to maximize profitability between products with different profit margins, technology complexities and capacity implications In view of the foregoing, there is a need in the art for a system, method and program product for analyzing fabricator capacity in a simplified manner.

SUMMARY OF THE INVENTION

A first aspect of the invention is directed to a method of determining fabricator capacity for a wafer start loading over a set time period, the wafer start loading having a number of wafer starts, the method comprising the steps of: a) determining a common tool set capacity by dividing wafer starts that use common non-key shared tool sets by an overall capacity parameter, wherein the overall capacity parameter is based on a strategic characteristic wafer start loading; b) determining a technology capacity by dividing the wafer starts of each technology within the wafer start loading by a corresponding unique tool set capacity for the respective technology; and c) determining key shared tool set capacity by: i) determining a capacity consumption factor for each key shared tool set used by at least one process; ii) determining a capacity consumption of each key shared tool set used by a process of the wafer start loading; iii) decreasing a remaining capacity value for each key shared tool set used by the process of the wafer start loading by a corresponding capacity consumption; iv) repeating steps ii) and iii) for each process of the wafer start loading; and v) determining the amount of wafer start capacity available for each process by dividing each remaining capacity value by a corresponding capacity consumption factor for a corresponding process.

A second aspect of the invention is directed to a method of determining fabricator capacity for a wafer start loading, the method comprising the steps of: organizing each technology the fabricator can produce into a component technology-based process and related design-based processes; determining a capacity consumption factor for each tool set by process; determining a capacity consumption for each tool set by process for the wafer start loading; decreasing a remaining capacity value of each tool set by at least one corresponding capacity consumption; and determining tool set capacity remaining by each process for the wafer start loading by dividing the remaining capacity value for each tool set by a corresponding capacity consumption factor.

A third aspect of the invention is directed to a system for determining fabricator capacity for a wafer start loading, the system comprising: a common tool set capacity analyzer for determining the capacity of the fabricator based on at least one common shared tool set; a technology capacity analyzer for determining the capacity of the fabricator based on at least one technology unique tool set; and a key shared tool set capacity analyzer for determining the capacity of a key shared tool set.

A fourth aspect is directed to a computer program product comprising a computer useable medium having computer readable program code embodied therein for reporting on performance of a plurality of parameters, the program product comprising: a) program code configured to determine a common tool set capacity by dividing wafer starts that use common non-key shared tool sets by an overall capacity parameter, wherein the overall capacity parameter is based on a strategic characteristic wafer start loading; b) program code configured to determine a technology capacity by dividing the wafer starts of each technology within the wafer start loading by a corresponding unique tool set capacity for the respective technology; and c) program code configured to determine key shared tool set capacity including: i) program code configured to determine a capacity consumption factor for each key shared tool set used by a process that is required by the wafer start loading; ii) program code configured to determine a capacity consumption of each key shared tool set used by the process; iii) program code configured to decrease a remaining capacity value for each key shared tool set used by the process by a corresponding capacity consumption; iv) program code configured to execute program code i), ii) and iii) for each process required by the wafer start loading; and v) program code configured to determine the amount of wafer start capacity available for each process by dividing each remaining capacity value by a corresponding capacity consumption factor for a corresponding process.

A fifth aspect of the invention is directed to a system for determining fabricator capacity for a wafer start loading, the system comprising: means for determining a common tool set capacity of the fabricator based on at least one common shared tool set; means for determining a technology capacity of the fabricator based on at least one technology unique tool set; and means for determining the capacity of at least one key shared tool set based on processes required by the wafer start loading.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For convenience only, the description includes the following subtitles:

I. Overview
II. Common Tool Set Capacity Analysis
III. Technology Capacity Analysis
IV. Key Shared Tool Set Analysis I. Overview The invention simplifies fabricator capacity analysis by approximating the capacity of the fabricator The approximation is conducted by evaluating three factors: common tool set capacity, specific technology capacity, and key shared tool set capacity. The common tool set capacity factor looks at the capacity of common, but non-key shared tool sets. Specific technology capacity considers the limiting unique tool set/process for each technology. Key shared tool set capacity is limited by pinchpoint, gating or key tool sets shared by many or all technologies. Collectively, these three factors approximate all aspects of the overall fabricator's capacity in a relatively simple fashion. For definitional purposes, a "wafer start loading," unless otherwise described, is a desired loading into a fabricator to be analyzed. The wafer start loading includes some number of desired wafer starts.

Figure 1:
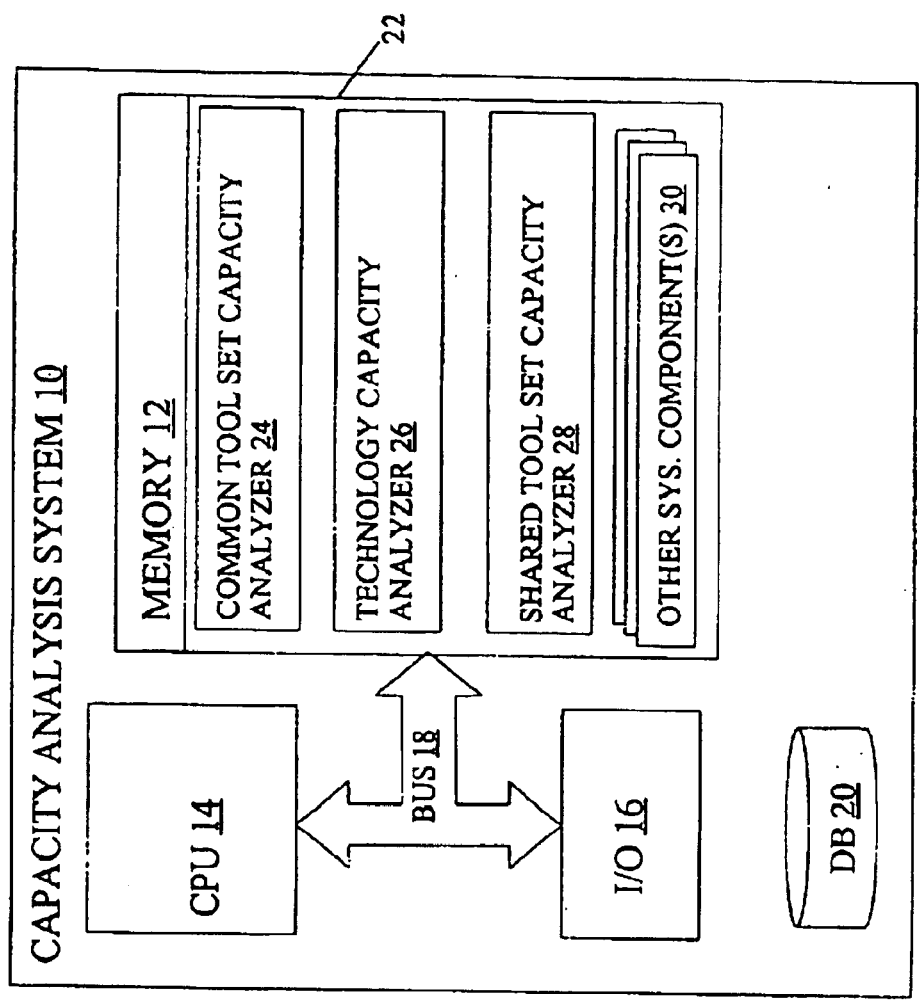
FIG. 1 shows a block diagram of a capacity analysis system.

With reference to the accompanying drawings, FIG. 1 is a block diagram of a capacity analysis system 10 in accordance with the invention. Capacity analysis system 10 includes a memory 12, a central processing unit (CPU) 14, input/output devices (I/O) 16 and a bus 18. A database 20 may also be provided for storage of data relative to processing tasks. Memory 12 preferably includes a program product 22 that, when executed by CPU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems. CPU 14 may likewise comprise a single processing unit, or a plurality of processing units distributed across one or more locations. A server computer typically comprises an advanced mid-range multiprocessor-based server, such as the RS6000 from IBM, utilizing standard operating system software, which is designed to drive the operation of the particular hardware and which is compatible with other system components and I/O controllers. I/O 16 may comprise any known type of input/output device including a network system, modem, keyboard, mouse, scanner, voice recognition system, CRT, printer, disc drives, etc. Additional components, such as cache memory, communication systems, system software, etc., may also be incorporated into system 10.

As shown in FIG. 1, program product 22 may include a common tool set capacity analyzer 24, a technology capacity analyzer 26, a shared tool set analyzer 28 and other system components 30. The operation, logic and processes of the invention are described in the sections that follow.

In the following description, it should be recognized that the analysis is carried out and predetermined values set based on a set time period. For instance, analysis is carried out by desired wafer starts, which occur over a set time period of, for instance, one month. Hence, all predetermined values and calculated values would be based on that one month period. The actual set time period may vary.

II. Common Tool Set Capacity Analysis

Figure 2:
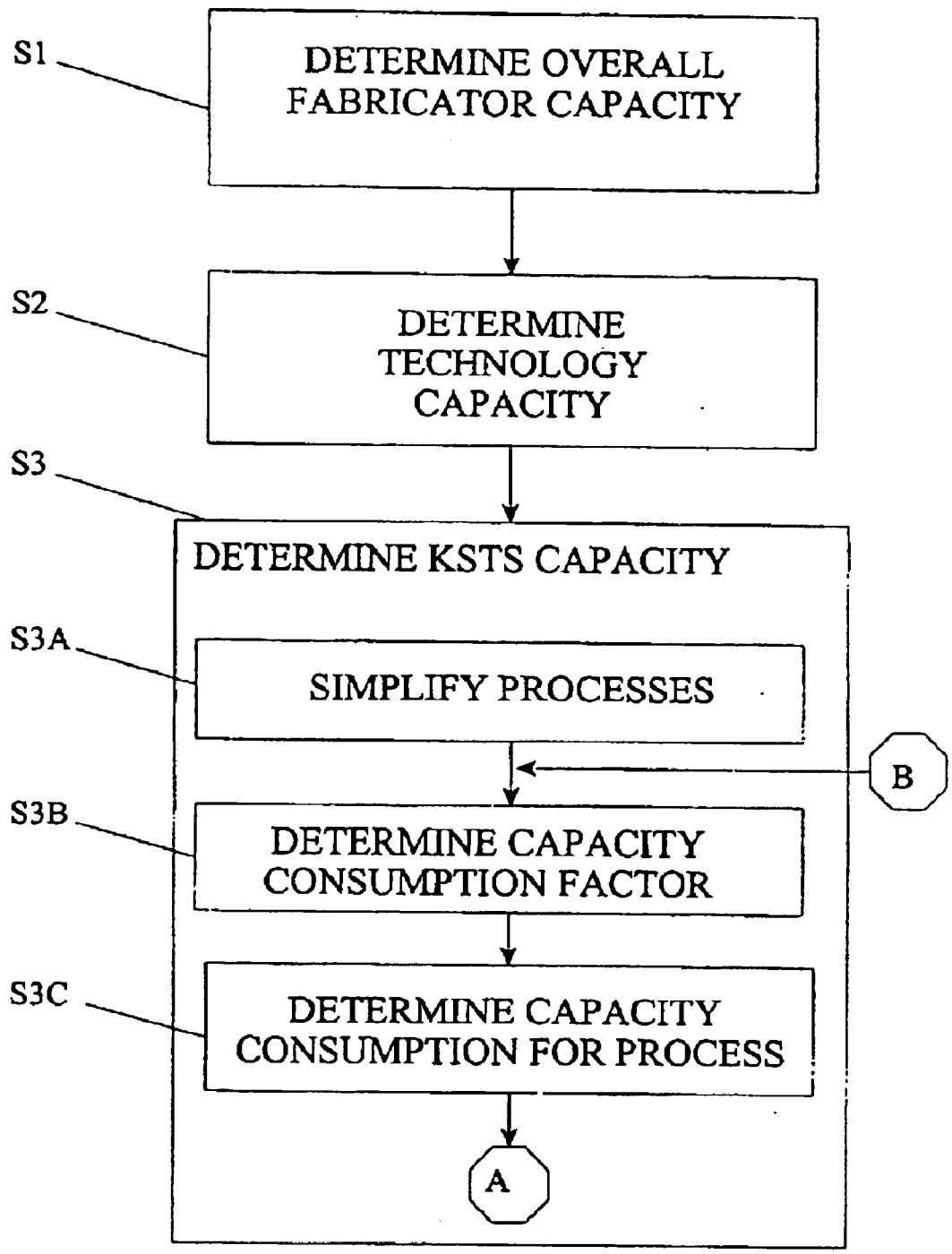
FIGS. 2–3 show a flow diagram of a method used by the system of FIG. 1.
Figure 3:
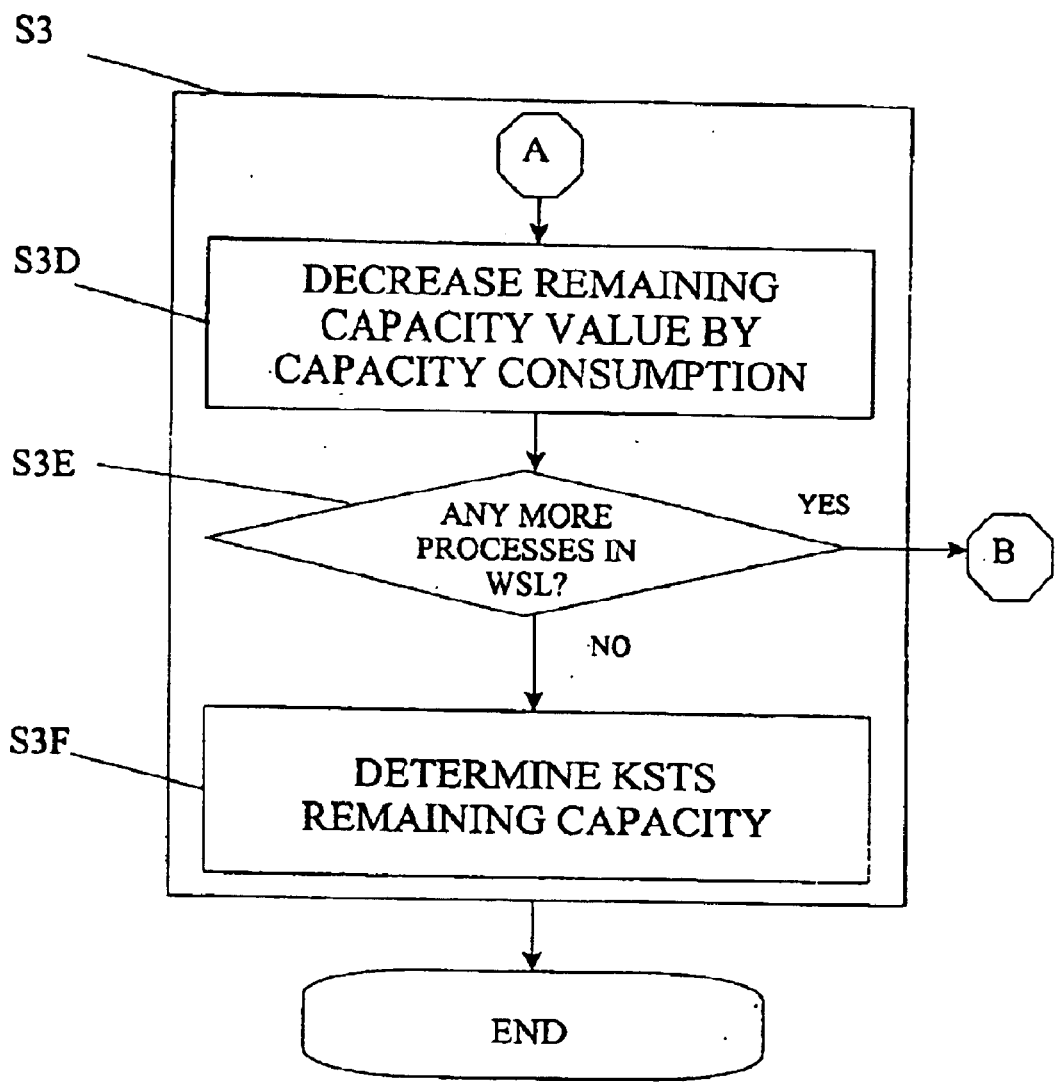

Referring to FIGS. 2–3, in a first step S1, a common tool set (CTS) capacity is determined by common tool set capacity analyzer 24 (FIG. 1) based on a ratio of an "CTS wafer starts" in a wafer start loading to an "overall capacity parameter." The "CTS wafer starts" include starts of all technologies that use common non-key shared tool sets. Exemplary common non-key shared tool sets include wets, strip tools, furnaces polishes, brush cleaners. The "overall capacity parameter" is based on the capacity of common, non-key shared tool sets. In one embodiment, the overall capacity parameter is determined by a capacity of a strategic characteristic wafer start loading. The strategic characteristic wafer start loading is a loading that is analyzed, perhaps one or twice a year, to determine capacity with a particular technology mix. Accordingly, this factor simply prevents wafer starts greater than a maximum for common, non-key shared tool sets. An exemplary calculation would be for a wafer start loading of 1000 wafer starts for a 3 month period that use common tool sets compared to a 1200 wafer start overall capacity parameter for that same period. The CTS capacity would be 83%, which shows available capacity.

III. Technology Capacity Analysis

Within a wafer start loading, a number of varying technologies that are each defined by a front-end-of-line process may exist. For instance, continuing with the above example of a 1000 wafer start loading, 500 wafer starts may be of CMOS-Aluminum technology, 250 of CMOS-Copper technology, and 250 of Silicon-Germanium technology. Each technology has at least one 'unique tool set' that it must access to complete processing. For instance, sputter deposition is a unique tool set necessary for CMOS-Copper technology.

In steps S2, technology capacity analyzer 26 (FIG. 1) determines capacity for each technology by dividing the number of wafer starts for each technology within a wafer start loading by a corresponding unique tool set (UTS) capacity. The UTS capacity is determined for each technology based on the capacity of that technology's unique tool set(s). In one embodiment, this factor is input into analyzer 26 based on a more complex analysis. The more complex analysis may include, for instance, calculating each individual technology's UTS capacity for a set time period (e.g., 2 months) by incrementing a wafer start load on corresponding unique tool set(s) until the capacity of one of the unique tool set(s) is consumed. The value so determined is the UTS capacity for that technology, and the unique tool set that is over-used is the 'limiting unique tool set' for the technology. This factor prevents wafer starts of a specific technology from exceeding the technology's capacity even if the fabricator is not full.

Figure 4:
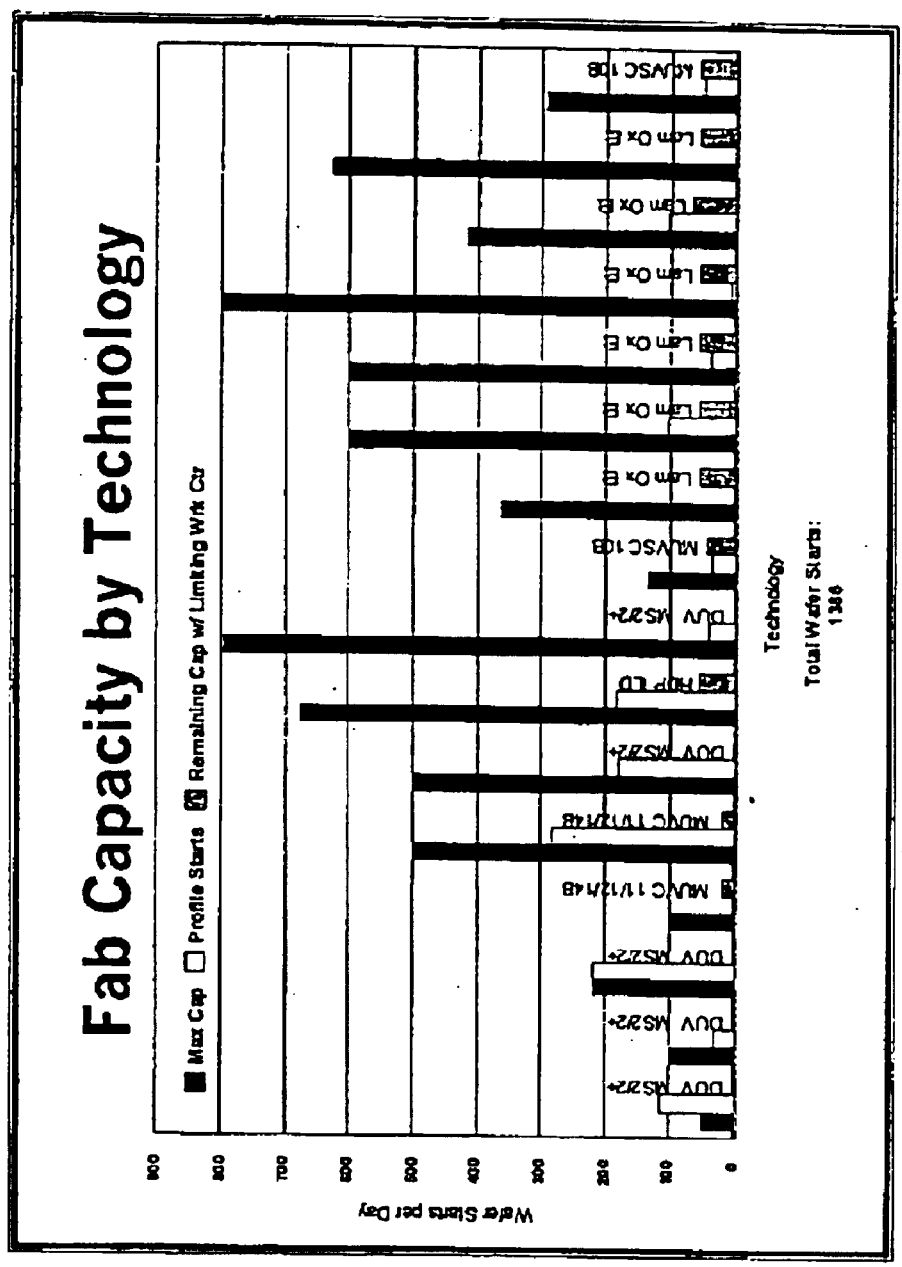
FIG. 4 shows a graph illustrating technology specific results.

Referring to FIG. 4, a graph showing capacity by technology is shown. In the graph, the maximum capacity for each technology with no other fabricator loading is shown in black, the number of wafers in each technology for the wafer start is in white, and the amount of remaining capacity for each technology is in gray. As illustrated, oftentimes one or more technologies are over their limit(s). If this is the case, actions can sometimes be taken in the short term to improve these capacities. If capacity improvements are not possible, and if there is a safety factor (or contingency) and sufficient raw capacity, the process can operate at a lower safety factor. If this is not possible, then the wafer starts for that specific technology must be reduced.

IV. Key Shared Tool Set Capacity Analysis

With continuing reference to FIGS. 2–3, key shared tool set (KSTS) capacity is determined, at step S3, by shared tool set analyzer 28 (FIG. 1). KSTS capacity is limited by tool sets shared by many or all technologies. These tool sets may also be referred to as pinchpoint or gating tool sets. Lithography, etch, implant and other major shared tool sets belong to this group. This factor makes the fabricator capacity analysis technology-mix sensitive by preventing wafer starts from different technologies from exceeding the capacities of the KSTSs.

A "capacity value" for a KSTS represents the maximum capacity over a set time period. A capacity value for each KSTS is calculated by the number of tools multiplied by the "KSTS weighted average throughput." The KSTS weighted average throughput is the average rate at which a tool of a KSTS operates times the number of tools within a KSTS. In some instances, there are various types of tools with different wafer throughput capabilities within a tool set. In this case, the average throughput capability is determined, or the number of tools are prorated appropriately. The KSTS weighted average throughput also varies with technology and is based on a weighted average of technologies. For example, a KSTS may include ten machines that operate at a weighted average throughput of 10 parts per hour based on tools of differing speed and different speed technologies. This would result in a KSTS weighted average throughput of 100 parts per hour.

A. Organization

In order to simplify analysis of this factor, organization and simplification of processes within a fabricator is provided in step S3A. Simplification can be conducted by analyzer 28 (FIG. 1) or manually input into analyzer 28. Simplification is provided by breaking a wafer start loading's technologies into two components: front-end-of-line (FEOL) and back-end-of-line (BEOL) processes. A FEOL process is considered as one entity, and a BEOL process as another. A FEOL process is defined by the technology, i.e., it is technology-based. Example FEOL processes include CMOS-Aluminum, CMOS-Copper, SiG-based processes, etc. In contrast, a BEOL process is defined by design issues such as the number of levels of metals, type, and difficulty, i.e., it is design-based. For example, a "3LMAN" process stands for the three level metal, aluminum, non-critical BEOL process; "7LMAN-UCC" for seven level metal, aluminum, ultra-critical copper BEOL process; etc.

Each FEOL process is associated with BEOL processes, and vice versa. For example, for convenience, three BEOL processes can be associated with each FEOL process. If there are more than three BEOL options within a technology, then typically the three most common processes are chosen unless some less common options are more demanding. In this situation, more demanding and consuming options could be chosen to ensure the capacity demands are adequately reflected. A BEOL process can be associated with any number of FEOL processes.

B. Analysis

Steps S3B-D represent a point in the process in which a particular wafer start loading is analyzed. Accordingly, once processes have been simplified (step S3A), this step may be omitted from the analysis.

In step S3B, a capacity consumption factor (CCF) for each KSTS used by at least one process, i.e., FEOL or BEOL process, is determined. CCF is defined as the capacity of a KSTS consumed by one wafer start of a particular process. In other words, CCF characterizes the capacity of a KSTS for each FEOL or BEOL process by indicating how much capacity a technology consumes of a KSTS for a single wafer start. Hence, CCF varies with tool set and corresponding FEOL or BEOL process. The equation for the capacity consumption factor is:

CCF=number of passes×safety factor×(KSTS weighted average throughput/process throughput)

The "number of passes" is the number of times a wafer start will be processed through a KSTS for a given process. For instance, for a particular process, a specific KSTS may be used ten times, while for another process, it maybe used only once. "Safety factor" is a factor such as 1.2 for 20% contingency. The KSTS weighted average throughput is as described above. Despite a tool's normal speed, each process takes a different amount of time with each tool and, hence, effects overall throughput. This is factored into the CCF by dividing the KSTS weighted average throughput by the "process throughput." The process throughput is the rate at which wafer starts for a given process are processed through a tool set in, for example, parts per hour. As an example, one process may limit throughput to 4 parts per hour on a given KSTS, while another process may allow full speed at 6 parts per hour on the same tool set.

An example for determining CCF is as follows: For a given wafer start loading, processes FEOL1, BEOL1, BEOL2, BEOL3 may be required. Focusing on just FEOL1, this process may use KSTS1 and KSTS2 and may pass through KSTS1 ten times versus only two passes for KSTS2. Focusing on just KSTS1, this tool set may include five machines that operate on average at 10 parts per hour. The process throughput for FEOL1 may, however, limit throughput to 8 parts per hour. Assuming a safety factor of 1.2, the CCF for KSTS1-FEOL1 would be 10 passes×1.2×10 pph/8 pph=15. CCFs for KSTS1-BEOL1-3, KSTS2-FEOL1 and KSTS2-BEOL1-3 would similarly be calculated.

The CCF determination can be made for every KSTS-process pair at the outset or it can be determined as each process of a wafer start loading is otherwise analyzed. FIG. 2 illustrates the latter situation in that step S3B occurs for a single process of the wafer start loading, subsequent processing (steps S3C and S3D) occurs and the process repeats for other processes. In this case, a CCF determination is made only for those KSTSs used by a process that is required by the particular wafer start loading in question. Alternatively, step S3B may include a CCF determination for every process of the fabricator. In this case, only subsequent processing (steps S3C and S3D) repeats and CCF values are simply imported as necessary. In either of the above-described scenarios, because each KSTS and process pairing may result in another CCF, a matrix that matches FEOL and BEOL processes and corresponding KSTSs used with corresponding CCFs can be created. This matrix may also be advantageous in matching processes to required KSTS, as will be described below.

In step S3C, a capacity consumption of each key shared tool set used by a process of the wafer start loading is determined by shared tool set analyzer 28 (FIG. 1). The analysis is process-based. The determination is made by multiplying the appropriate CCF for the KSTS(s) (based on respective-FEOL/BEOL process) by the number of wafer starts that will use the respective KSTS(s). For example, using the above CCF example, for a wafer start loading of 1000 wafers, 50 of the wafer starts may use the FEOL1 process which requires KSTS1. The capacity consumption for KSTS1 for FEOL1 would be 750, i.e., CCF for KSTS1-FEOL1 of 15 times 50 wafers. Other KSTSs may also be used by FEOL1 and their capacity consumption.

Next, at step S3D, a remaining capacity value for each key shared tool set used by the process of the wafer start loading is decreased by a corresponding capacity consumption determined in step S3C by analyzer 28 (FIG. 1). The remaining capacity value is initially equal to the capacity value. For instance, KSTS1 may have a capacity value of 10,000 wafers. The capacity remaining value, based on the above capacity consumption for FEOL1, would be 10,000−750= 9,250. Other KSTSs used by the particular process would similarly have their remaining capacity value decreased appropriately.

In step S3E, analyzer 28 repeats steps S3C and S3D for each process required by the wafer start loading if a CCF determination for every process of the fabricator is made. Otherwise, steps S3B, S3C and S3D are repeated for each process of the wafer start loading. As a result, the remaining capacity value for each KSTS for all processes, i.e., FEOL and BEOL processes, used in a wafer start loading is/are appropriately decreased. For instance, other processes may also use KSTS1, and their capacity consumption would also be calculated and removed from the remaining capacity value for KSTS1. A determination of which processes, i.e., FEOL and BEOL processes, will be used for a wafer start loading may be ascertained quickly by reference to the above described matrix. If a KSTS becomes over utilized, its remaining capacity value will become negative.

After the last process of a wafer start loading is analyzed, at step S3F, a determination of the amount of wafer start capacity available for each process is made. In one embodiment, this determination is made by dividing each remaining capacity value by a corresponding CCF for a corresponding process. The result indicates the number of wafer starts of a particular process that can be started without overloading the KSTS. The result is KSTS-process specific. For instance, if we want to know the capacity for wafer starts that use FEOL1, we would divide the remaining capacity value for each KSTS used by FEOL1 by their corresponding CCF. In the above example, KSTS1 has a remaining capacity value of 9,250. This value divided by the KSTS1-FEOL1 CCF of 15 leads to 616 wafer starts. Accordingly, the fabricator can withstand 616 wafer starts that use the FEOL1 process. Of course, if a remaining capacity value for a KSTS is negative, no capacity remains and the calculation of step S3F can be ignored or omitted. The minimum value is the opportunity or amount over capacity for that process. A graph substantially similar to that shown in FIG. 4 can be created to illustrate available capacity. In that case, the different processes rather than technology would be listed.

Figure 5:
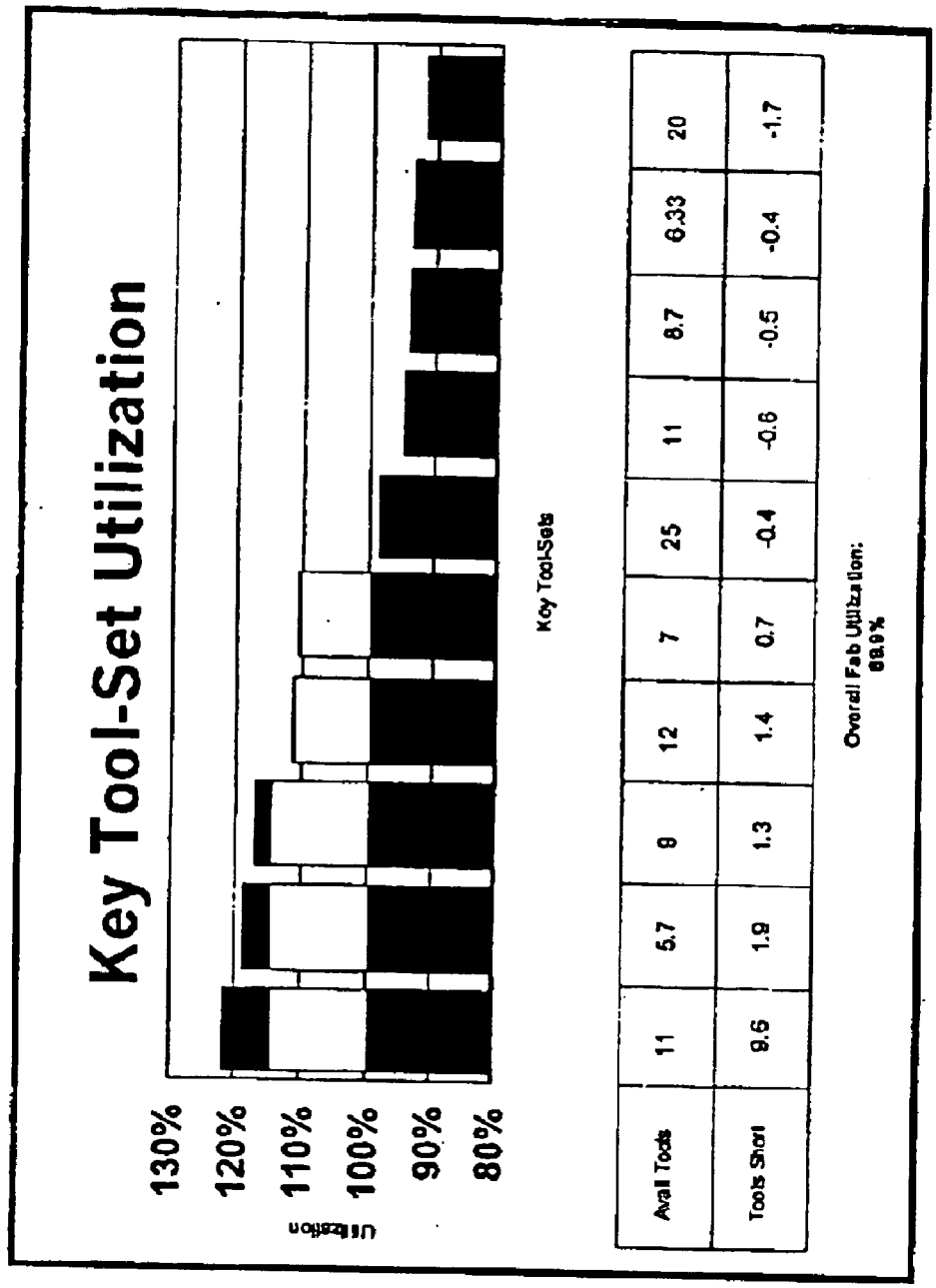
FIG. 5 shows a graph illustrating key shared tool set results.

Referring to FIG. 5, a graph illustrating the ratio of a KSTS's remaining capacity value to its original capacity value is shown. This is referred to as the KSTS's utilization. If this value is greater than 100% the tool set is over-utilized. FIG. 5 also includes a table showing available tools and tool shortages for each KSTS.

With any wafer loading that pushes the capacity of the fabricator, there will be over-utilized KSTSs. Sometimes actions can be taken to improve the capacity of a tool set in the short term, or the load can be diverted to another tool set; or, if there is a safety factor/contingency built into the analysis, the tool set can operate at a lower safety margin. If none of these options are feasible, than the wafer load must be reduced.

In an alternative embodiment of the invention, key shared tool set capacity analysis may be conducted alone. In this case, the method would include the steps of: organizing each technology the fabricator can produce into a component technology-based process and related design-based processes; determining a capacity consumption factor for each tool set by process; determining a capacity consumption for each tool set by process for the wafer start loading; decreasing a remaining capacity value of each tool set by at least one corresponding capacity consumption; and determining tool set capacity remaining by each process for the wafer start loading by dividing the remaining capacity value for each tool set by a corresponding capacity consumption factor.

The above-described invention simplifies fabricator capacity analysis such that quick decision making is possible. More in-depth analysis can be carried out on situations that have positive results from the invention.

In the previous discussion, it will be understood that the method steps discussed preferably are performed by a processor, such as CPU 14 of system 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of determining fabricator capacity for a wafer start loading over a set time period, the wafer start loading having a number of wafer starts, the method comprising the steps of:
   a) determining a common tool set capacity by dividing wafer starts that use common non-key shared tool sets by an overall capacity parameter, wherein the overall capacity parameter is based on a strategic characteristic wafer start loading;
   b) determining a technology capacity by dividing the wafer starts of each technology within the wafer start loading by a corresponding unique tool set capacity for the respective technology; and c) determining key shared tool set capacity by:
   i) determining a capacity consumption factor for each key shared tool set used by at least one process;
   ii) determining a capacity consumption of each key shared tool set used by a process of the wafer start loading;
   iii) decreasing a remaining capacity value for each key shared tool set used by the process of the wafer start loading by a corresponding capacity consumption;
   iv) repeating steps ii) and iii) for each process of the wafer start loading; and
   v) determining the amount of wafer start capacity available for each process by dividing each remaining capacity value by a corresponding capacity consumption factor for a corresponding process.

2. The method of claim 1, wherein the at least one process includes every process of the fabricator.

3. The method of claim 1, wherein the at least one process is a single process of the wafer start loading.

4. The method of claim 1, wherein the capacity consumption factor is determined according to the formula:

$$\text{capacity consumption factor} = \text{number of passes} \times \text{safety factor} \times (\text{key shared tool set throughput}/\text{process throughput}),$$

wherein the number of passes is the number of times a wafer start will be processed through the key shared tool set for a given process, tool set throughput is the average rate at which a tool of the key shared tool set operates times the number of tools within the set, and process throughput is the rate at which wafer starts for a given process are processed through the key shared tool set.

5. The method of claim 1, further comprising the step of organizing processes required by a wafer start loading into technology-based processes and design-based processes.

6. The method of claim 5, wherein each technology-based process is associated with at least three design-based processes.

7. A method of determining fabricator capacity for a wafer start loading, the method comprising the steps of:
   organizing each technology the fabricator can produce into a component technology-based process and related design-based processes;
   determining a capacity consumption factor for each tool set by process;
   determining a capacity consumption for each tool set by process for the wafer start loading;
   decreasing a remaining capacity value of each tool set by at least one corresponding capacity consumption; and
   determining tool set capacity remaining by each process for the wafer start loading by dividing the remaining capacity value for each tool set by a corresponding capacity consumption factor.

8. A system for determining fabricator capacity for a wafer start loading, the system compromising:
   a common tool set capacity analyzer for determining the capacity of the fabricator based on at least one common shared tool set;
   a technology capacity analyzer for determining the capacity of the fabricator based on at least one technology unique tool set; and
   a key shared tool set capacity analyzer for determining the capacity of a key shared tool set.

9. The system of claim 8, wherein the key shared tool set capacity analyzer determines the capacity of a key shared tool set based on the division of a remaining capacity value for the key shared tool set after decreasing for capacity consumption by processes of the wafer start loading by a capacity consumption factor.

10. The system of claim 9, wherein the capacity consumption factor is determined according to the formula:

$$\text{capacity consumption factor} = \text{number of passes} \times \text{safety factor} \times (\text{key shared tool set throughput}/\text{process throughput}),$$

wherein the number of passes is the number of times a wafer start will be processed through the key shared tool set for a given process, tool set throughput is the average rate at which a tool of the key shared tool set operates times the number of tools within the set, and process throughput is the rate at which wafer starts for a given process are processed through the key shared tool set.

11. The system of claim 8, wherein the key shared tool set capacity analyzer analyzes processes of the wafer start loading by technology-based processes and design-based processes.

12. The method of claim 11, wherein each technology-based process is associated with at least three design-based processes.

13. A computer program product comprising a computer useable medium having computer readable program code embodied therein for reporting on performance of a plurality of parameters, the program product comprising:
   a) program code configured to determine a common tool set capacity by dividing wafer starts that use common non-key shared tool sets by an overall capacity parameter, wherein the overall capacity parameter is based on a strategic characteristic wafer start loading;
   b) program code configured to determine a technology capacity by dividing the wafer starts of each technology within the wafer start loading by a corresponding unique tool set capacity for the respective technology; and
   c) program code configured to determine key shared tool set capacity including:
      i) program code configured to determine a capacity consumption factor for each key shared tool set used by a process that is required by the wafer start loading;
      ii) program code configured to determine a capacity consumption of each key shared tool set used by the process;
      iii) program code configured to decrease a remaining capacity value for each key shared tool set used by the process by a corresponding capacity consumption;
      iv) program code configured to execute program code i), ii) and iii) for each process required by the wafer start loading; and
      v) program code configured to determine the amount of wafer start capacity available for each process by dividing each remaining capacity value by a corresponding capacity consumption factor for a corresponding process.

14. The program product of claim 13, wherein the capacity consumption factor is determined according to the formula:

$$\text{capacity consumption factor} = \text{number of passes} \times \text{safety factor} \times (\text{key shared tool set throughput}/\text{process throughout}),$$

wherein the number of passes in the numer of times a wafer start will be processed through the key shared tool set for a given process, tool set throughput is the average rate at which a tool of the key shared tool set operates times the number of tools within the set, and process throughput is the rate at which wafer starts for a given process are processed through the key shared tool set.

15. The program product of claim 13, wherein the process of the wafer start loading are analyzed by technology-based processes and design-based processes.

16. The program product of claim 15, wherein each technology-based process is associated with at least three design-based processes.

17. A system for determining fabricator capacity for a wafer start loading, the system comprising:

means for determining a common tool set capacity of the fabricator based on at least one common shared tool set;

means for determining a technology capacity of the fabricator based on at least one technology unique tool set; and means for determining the capacity of at least one key shared tool set based on processes required by the wafer start loading.

* * * * *

Disclaimer 6,823,228 B2 — Otto J. Funke, North Ferrisburgh, VT (US); Edward F. Merrill, Jr., Alburg, VT (US); Manoj S. Sanghvi, So. Burlington, VT (US); Sharon Sisler, Waterbury, VT (US); George E. Thyng, Williston, VT (US). FABRICATOR CAPACITY ANALYSIS. Patent dated November 23, 2004. Disclaimer filed October 5, 2006, by the assignee, International Business Machines Corporation.

Hereby enters this disclaimer to claims 1-17, of said patent.

(*Official Gazette October 14, 2008*)